US006848316B2

(12) United States Patent
Sittler et al.

(10) Patent No.: US 6,848,316 B2
(45) Date of Patent: Feb. 1, 2005

(54) PRESSURE SENSOR ASSEMBLY (75) Inventors: Fred C. Sittler, Excelsior, MN (US); Christina A. Nord, Shakopee, MN (US); Mark G. Romo, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 43 days.

(21) Appl. No.: 10/142,011

(22) Filed: May 8, 2002

(65) Prior Publication Data

US 2003/0209080 A1 Nov. 13, 2003

(51) Int. Cl.[7] .............................................. G01L 7/00
(52) U.S. Cl. .......................................... 73/706; 73/756
(58) Field of Search .......................... 73/706–715, 756, 73/700, 724, 729.2

(56) References Cited

U.S. PATENT DOCUMENTS

| 3,079,576 A | 2/1963 | Kooiman ........................ 338/4 |
| 3,147,085 A | 9/1964 | Gatti ........................... 23/284 |

(List continued on next page.)

FOREIGN PATENT DOCUMENTS

| CH | 632 891 G | 11/1982 |
| CZ | 153132 | 5/1974 |
| DE | 1 648 764 | 6/1971 |
| DE | 2 021 479 | 11/1971 |
| DE | 2 221 062 | 11/1972 |
| DE | 24 59 612 | 7/1975 |
| DE | 34 04 262 A1 | 9/1984 |
| DE | 40 11 901 A1 | 10/1991 |
| DE | 42 44 450 A1 | 12/1992 |
| EP | 0 024 945 A2 | 9/1980 |
| EP | 0 136 050 A1 | 8/1984 |
| EP | 0 161 740 A2 | 2/1985 |
| EP | 0 166 218 A2 | 5/1985 |
| EP | 0 182 032 A2 | 9/1985 |
| EP | 0 190 508 A2 | 12/1985 |
| EP | 0 207 272 A2 | 5/1986 |
| EP | 0 213 299 A2 | 6/1986 |
| EP | 0 210 843 A2 | 7/1986 |
| EP | 0 256 150 A1 | 8/1986 |
| EP | 0 351 701 B1 | 7/1989 |
| EP | 0 355 340 A1 | 2/1990 |
| EP | 0 383 391 A1 | 8/1990 |
| EP | 0 430 676 A2 | 11/1990 |
| EP | 0 410 679 A1 | 1/1991 |
| EP | 0 413 547 A2 | 2/1991 |
| EP | 0 444 942 A1 | 9/1991 |
| EP | 0 444 943 A | 9/1991 |
| EP | 0 451 993 A2 | 10/1991 |
| EP | 0 456 060 A1 | 11/1991 |
| EP | 0 460 763 A2 | 11/1991 |
| EP | 0 473 109 A2 | 3/1992 |
| EP | 0 476 897 A2 | 3/1992 |
| EP | 0 526 290 A1 | 2/1993 |
| EP | 0 547 684 A2 | 6/1993 |
| EP | 0 556 009 A2 | 8/1993 |
| EP | 0 579 298 A1 | 1/1994 |

(List continued on next page.)

OTHER PUBLICATIONS

"International Search Report"PCT/US03/11923.
"International Search Report"PCT/US03/11923.

(List continued on next page.)

*Primary Examiner*—Edward Lefkowitz
*Assistant Examiner*—Alandra Ellington
(74) *Attorney, Agent, or Firm*—Westman, Champlin & Kelly P.A.

(57) ABSTRACT

A pressure sensor assembly includes an elongate pressure sensor mounted to a sensor mounting block. A protective element covers the elongate pressure sensor to prevent the pressure sensor from contacting process fluid.

27 Claims, 4 Drawing Sheets

U.S. PATENT DOCUMENTS

| | | | |
|---|---|---|---|
| 3,239,827 A | 3/1966 | Werner et al. | 340/236 |
| 3,356,963 A | 12/1967 | Buck | 331/65 |
| 3,387,226 A | 6/1968 | Haisma et al. | 331/94.5 |
| 3,405,559 A | 10/1968 | Moffatt | 73/398 |
| 3,477,036 A | 11/1969 | Haisma | 331/94.5 |
| 3,589,965 A | 6/1971 | Wallis et al. | 156/272 |
| 3,645,137 A | 2/1972 | Hazen | 73/398 |
| 3,696,985 A | 10/1972 | Herring et al. | 228/4.29 |
| 3,743,552 A | 7/1973 | Fa | 148/175 |
| 3,744,120 A | 7/1973 | Burgess et al. | 29/494 |
| 3,750,476 A | 8/1973 | Brown | 73/398 |
| 3,766,634 A | 10/1973 | Babcock et al. | 29/471.9 |
| 3,834,604 A | 9/1974 | Fendley et al. | 228/5 |
| 3,854,892 A | 12/1974 | Burgess et al. | 29/196.1 |
| 3,858,097 A | 12/1974 | Polye | 317/248 |
| 3,899,878 A | 8/1975 | Compton et al. | 60/39.28 T |
| 3,939,559 A | 2/1976 | Fendley et al. | 29/628 |
| RE28,798 E | 5/1976 | Herring et al. | 228/5.5 |
| 3,962,921 A | 6/1976 | Lips | 73/398 |
| 3,994,430 A | 11/1976 | Cusano et al. | 228/122 |
| 4,018,374 A | 4/1977 | Lee et al. | 228/121 |
| 4,064,549 A | 12/1977 | Cretzler | 361/283 |
| 4,078,711 A | 3/1978 | Bell et al. | 228/123 |
| 4,084,438 A | 4/1978 | Lee et al. | 73/706 |
| 4,088,799 A | 5/1978 | Kurtin | 427/38 |
| 4,127,840 A | 11/1978 | House | 338/4 |
| 4,128,006 A | 12/1978 | Grabow | 73/724 |
| 4,158,217 A | 6/1979 | Bell | 361/283 |
| 4,177,496 A | 12/1979 | Bell et al. | 361/283 |
| 4,196,632 A | 4/1980 | Sikorra | 73/718 |
| 4,202,217 A | 5/1980 | Kurtz et al. | 73/727 |
| 4,208,782 A | 6/1980 | Kurtz et al. | 29/580 |
| 4,216,404 A | 8/1980 | Kurtz et al. | 310/338 |
| 4,222,277 A | 9/1980 | Kurtz et al. | 73/721 |
| 4,236,137 A | 11/1980 | Kurtz et al. | 338/4 |
| 4,257,274 A | 3/1981 | Shimada et al. | 73/718 |
| 4,274,125 A | 6/1981 | Vogel | 361/283 |
| 4,276,533 A | 6/1981 | Tominaga et al. | 338/4 |
| 4,278,195 A | 7/1981 | Singh | 228/123 |
| 4,287,501 A | 9/1981 | Tominaga et al. | 338/42 |
| 4,301,492 A | 11/1981 | Paquin et al. | 361/283 |
| 4,359,498 A | 11/1982 | Mallon et al. | 428/156 |
| 4,366,716 A | 1/1983 | Yoshida | 73/718 |
| 4,389,895 A | 6/1983 | Rud, Jr. | 73/724 |
| 4,410,872 A | 10/1983 | Stecher et al. | 338/114 |
| 4,412,203 A | 10/1983 | Kurtz et al. | 338/4 |
| 4,416,156 A | 11/1983 | Denmark et al. | 73/727 |
| 4,419,142 A | 12/1983 | Matsukawa | 148/1.5 |
| 4,422,125 A | 12/1983 | Antonazzi et al. | 361/283 |
| 4,422,335 A | 12/1983 | Ohnesorge et al. | 73/724 |
| 4,424,713 A | 1/1984 | Kroninger, Jr. et al. | 73/718 |
| 4,426,673 A | 1/1984 | Bell et al. | 361/283 |
| 4,434,665 A | 3/1984 | Adolfsson et al. | 73/724 |
| 4,443,293 A | 4/1984 | Mallon et al. | 156/647 |
| 4,454,765 A | 6/1984 | Lodge | 73/724 |
| 4,456,901 A | 6/1984 | Kurtz et al. | 338/4 |
| 4,479,070 A | 10/1984 | Frische et al. | 310/338 |
| 4,495,820 A | 1/1985 | Shimada et al. | 73/724 |
| 4,497,473 A | 2/1985 | Robyn et al. | 266/44 |
| 4,507,973 A | 4/1985 | Barr et al. | 73/724 |
| 4,517,622 A | 5/1985 | Male | 361/283 |
| 4,525,766 A | 6/1985 | Petersen | 361/283 |
| 4,535,219 A | 8/1985 | Sliwa, Jr. | 219/121 |
| 4,539,061 A | 9/1985 | Sagiv | 156/278 |
| 4,542,436 A | 9/1985 | Carusillo | 361/283 |
| 4,547,801 A | 10/1985 | Haisma et al. | 358/111 |
| 4,558,817 A | 12/1985 | Kiendl | 236/12.12 |
| 4,572,000 A | 2/1986 | Kooiman | 73/718 |
| 4,586,109 A | 4/1986 | Peters et al. | 261/283 |
| 4,591,401 A | 5/1986 | Neidig et al. | 156/89 |
| 4,598,996 A | 7/1986 | Taniuchi | 356/43 |
| 4,609,966 A | 9/1986 | Kuisma | 361/283 |
| 4,625,559 A | 12/1986 | Carter et al. | 73/706 |
| 4,628,403 A | 12/1986 | Kuisma | 361/283 |
| 4,649,070 A | 3/1987 | Kondo et al. | 428/209 |
| 4,689,999 A | 9/1987 | Shkedi | 73/708 |
| 4,703,658 A | 11/1987 | Mrozack, Jr. et al. | 73/724 |
| 4,716,492 A | 12/1987 | Charboneau et al. | 73/718 |
| 4,732,663 A | 3/1988 | Kato et al. | 204/426 |
| 4,753,109 A | 6/1988 | Zabler | 73/115 |
| 4,754,365 A | 6/1988 | Kazahaya | 361/283 |
| 4,764,747 A | 8/1988 | Kurtz et al. | 338/2 |
| 4,769,882 A | 9/1988 | Rosen et al. | 29/25.35 |
| 4,773,972 A | 9/1988 | Mikkor | 204/16 |
| 4,774,196 A | 9/1988 | Blanchard | 437/24 |
| 4,780,572 A | 10/1988 | Kondo et al. | 174/52 |
| 4,800,758 A | 1/1989 | Knecht et al. | 73/727 |
| 4,806,783 A | 2/1989 | Anderson | 307/118 |
| 4,810,318 A | 3/1989 | Haisma et al. | 156/153 |
| 4,849,374 A | 7/1989 | Chen et al. | 437/209 |
| 4,852,408 A | 8/1989 | Sanders | 73/718 |
| 4,857,130 A | 8/1989 | Curtis | 156/292 |
| 4,875,368 A | 10/1989 | Delatorre | 73/151 |
| 4,879,903 A | 11/1989 | Ramsey et al. | 73/431 |
| 4,883,215 A | 11/1989 | Goesele et al. | 228/116 |
| 4,901,197 A | 2/1990 | Albarda et al. | 361/283 |
| 4,908,921 A | 3/1990 | Chen et al. | 29/25.41 |
| 4,929,893 A | 5/1990 | Sato et al. | 324/158 |
| 4,954,925 A | 9/1990 | Bullis et al. | 361/283 |
| 4,971,925 A | 11/1990 | Alexander et al. | 437/62 |
| 4,972,717 A | 11/1990 | Southworth et al. | 73/724 |
| 4,980,243 A | 12/1990 | Malikowski et al. | 428/621 |
| 4,983,251 A | 1/1991 | Haisma et al. | 156/630 |
| 4,994,781 A | 2/1991 | Sahagen | 338/47 |
| 5,001,934 A | 3/1991 | Tuckey | 73/721 |
| 5,005,421 A | 4/1991 | Hegner et al. | 73/72 |
| 5,009,689 A | 4/1991 | Haisma et al. | 65/33 |
| 5,013,380 A | 5/1991 | Aoshima | 156/250 |
| 5,024,098 A | 6/1991 | Petitjean et al. | 73/729 |
| 5,028,558 A | 7/1991 | Haisma et al. | 437/62 |
| 5,044,202 A | 9/1991 | Southrth et al. | 73/724 |
| 5,050,034 A | 9/1991 | Hegner et al. | 361/283 |
| 5,050,035 A | 9/1991 | Hegner et al. | 361/283 |
| 5,068,712 A | 11/1991 | Murakami et al. | 357/72 |
| 5,084,123 A | 1/1992 | Curtis | 156/292 |
| 5,085,223 A * | 2/1992 | Lars et al. | 73/706 |
| 5,087,124 A | 2/1992 | Smith et al. | 356/358 |
| 5,088,329 A | 2/1992 | Sahagen | 73/727 |
| 5,094,109 A | 3/1992 | Dean et al. | 73/718 |
| 5,095,741 A | 3/1992 | Bartig et al. | 73/115 |
| 5,113,868 A | 5/1992 | Wise et al. | 128/675 |
| 5,123,849 A | 6/1992 | Deak et al. | 439/66 |
| 5,133,215 A | 7/1992 | Lane, III et al. | 73/756 |
| 5,155,061 A | 10/1992 | O'Connor et al. | 437/86 |
| 5,157,972 A | 10/1992 | Broden et al. | 73/718 |
| 5,174,926 A | 12/1992 | Sahagen | 252/521 |
| 5,178,015 A | 1/1993 | Loeppert et al. | 73/718 |
| 5,189,591 A | 2/1993 | Bernot | 361/283 |
| 5,189,916 A | 3/1993 | Mizumoto et al. | 73/724 |
| 5,197,892 A | 3/1993 | Yoshizawa et al. | 439/91 |
| 5,201,228 A | 4/1993 | Kojima et al. | 73/724 |
| 5,201,977 A | 4/1993 | Aoshima | 156/153 |
| 5,214,563 A | 5/1993 | Estes | 361/386 |
| 5,214,961 A | 6/1993 | Kojima et al. | 73/715 |
| 5,227,068 A | 7/1993 | Runyon | 210/610 |
| 5,228,862 A | 7/1993 | Baumberger et al. | 439/66 |
| 5,231,301 A | 7/1993 | Peterson et al. | 257/419 |
| 5,236,118 A | 8/1993 | Bower et al. | 228/193 |
| 5,242,863 A | 9/1993 | Xiang-Zheng et al. | 437/228 |
| 5,242,864 A | 9/1993 | Fassberg et al. | 437/228 |
| 5,257,542 A | 11/1993 | Voss | 73/724 |

| | | | |
|---|---|---|---|
| 5,261,999 A | 11/1993 | Pinker et al. | 156/630 |
| 5,271,277 A | 12/1993 | Pandorf | 73/724 |
| 5,287,746 A | 2/1994 | Broden | 73/706 |
| 5,294,760 A | 3/1994 | Bower et al. | 200/83 |
| 5,314,107 A | 5/1994 | d'Aragona et al. | 228/116 |
| 5,315,481 A | 5/1994 | Smolley | 361/707 |
| 5,319,324 A | 6/1994 | Satoh et al. | 331/158 |
| 5,326,726 A | 7/1994 | Tsang et al. | 437/228 |
| 5,332,469 A | 7/1994 | Mastrangelo | 156/643 |
| 5,349,492 A | 9/1994 | Kimura et al. | 361/283.4 |
| 5,381,300 A | 1/1995 | Thomas et al. | 361/280 |
| 5,424,650 A | 6/1995 | Frick | 324/688 |
| 5,437,189 A | 8/1995 | Brown et al. | 73/721 |
| 5,440,075 A | 8/1995 | Kawakita et al. | 174/265 |
| 5,466,630 A | 11/1995 | Lur | 437/62 |
| 5,470,797 A | 11/1995 | Mastrangelo | 437/225 |
| 5,471,884 A | 12/1995 | Czarnocki et al. | 73/720 |
| 5,478,972 A | 12/1995 | Mizutani et al. | 174/250 |
| 5,479,827 A | 1/1996 | Kimura et al. | 73/718 |
| 5,481,795 A | 1/1996 | Hatakeyama et al. | 29/852 |
| 5,483,834 A | 1/1996 | Frick | 73/724 |
| 5,528,452 A | 6/1996 | Ko | 361/283.4 |
| 5,532,187 A | 7/1996 | Schreiber-Prillwitz et al. | 437/182 |
| 5,554,809 A | 9/1996 | Tobita et al. | 73/700 |
| 5,612,497 A | 3/1997 | Walter et al. | 73/756 |
| 5,637,802 A * | 6/1997 | Frick et al. | 73/724 |
| 5,731,522 A * | 3/1998 | Sittler | 73/708 |
| 5,808,205 A | 9/1998 | Romo | 73/718 |
| 6,016,702 A | 1/2000 | Maron | 73/705 |
| 6,079,276 A | 6/2000 | Frick et al. | 73/718 |
| 6,082,199 A | 7/2000 | Frick et al. | 73/724 |
| 6,089,097 A | 7/2000 | Frick et al. | 73/718 |
| 6,106,476 A | 8/2000 | Corl et al. | 600/486 |
| 6,126,889 A | 10/2000 | Scott et al. | 264/632 |
| 6,131,462 A | 10/2000 | EerNisse et al. | 73/702 |
| 6,182,498 B1 * | 2/2001 | Mizutani et al. | 73/23.32 |
| 6,311,563 B1 | 11/2001 | Ishikura | 73/724 |
| 6,508,129 B1 * | 1/2003 | Sittler | 73/756 |
| 6,561,038 B2 * | 5/2003 | Gravel et al. | 73/729.2 |

FOREIGN PATENT DOCUMENTS

| | | |
|---|---|---|
| EP | 0 928 959 A2 | 7/1999 |
| FR | 1 568 487 | 5/1969 |
| FR | 2 246 506 | 5/1975 |
| FR | 2 455 733 | 11/1980 |
| GB | 1 069 435 | 11/1963 |
| GB | 1 305 885 | 4/1971 |
| GB | 2034478 | 6/1980 |
| GB | 2 071 853 A | 3/1981 |
| GB | 2 168 160 A | 11/1985 |
| JP | 49-38911 | 4/1974 |
| JP | 60-97676 | 5/1985 |
| JP | 62-70271 | 3/1987 |
| JP | 60-195546 | 7/1987 |
| JP | 62-104131 | 7/1987 |
| JP | 62-167426 | 7/1987 |
| JP | 62-259475 | 11/1987 |
| JP | 63-285195 | 11/1988 |
| JP | 63-292032 | 11/1988 |
| JP | 91-311556 | 4/1990 |
| JP | 2-148768 | 6/1990 |
| JP | 2-249936 | 10/1990 |
| JP | 3-239940 | 10/1991 |
| JP | 2852593 | 3/1993 |
| JP | 5-107254 | 4/1993 |
| JP | 5-231975 | 9/1993 |
| JP | 6-21741 | 1/1994 |
| JP | 6-265428 | 9/1994 |
| JP | 6-300650 | 10/1994 |
| JP | 283761 | 10/1998 |
| JP | 11006780 | 12/1999 |
| SU | 463643 | 10/1975 |
| SU | 736216 | 5/1980 |
| SU | 1398825 A1 | 5/1988 |
| SU | 1597627 A1 | 10/1990 |
| SU | 1629763 A1 | 2/1991 |
| WO | WO 83/00385 | 2/1983 |
| WO | WO 85/02677 | 6/1985 |
| WO | WO 87/07947 | 12/1987 |
| WO | WO 87/07948 | 12/1987 |
| WO | WO 93/22644 | 11/1993 |
| WO | WO 96/16418 | 5/1996 |
| WO | WO 96/27123 | 9/1996 |

OTHER PUBLICATIONS

"Silicon–on–Sapphire Pressure Sensor", by C. Qinggui et al., *TRANSDUCERS*, (1987), 4 pgs.

"Spectroscopic Study of the Surfaces of Glass Joined by Optical Contact", by V.M. Zolotarev et al., *Sov. J. Opt. Technol.*, (June 1977), pp. 379–380.

"Effect of Scale and Time Factors on the Mechanical Strength of an Optical Contact", by S.S. Kachkin et al., *Sov. J. Opt. Technol.*, Vol. 56, No., 2, (Febuary 1989), pp. 110–112.

"High Pressure Sensors", *Instrument Engineers Handbook Vol. 1, Process Measurement*, B. Liptak, Editor, pp. 244–245.

"Silicon on Sapphire: The Key Technology for High–Temperature Piezoresistive Pressure Transducers", by H.W. Keller et al., *TRANSDUCERS*, (1987), 4 pgs.

"Optical–Contact Bonding Strength of Glass Components", by S.S. Kachkin et al., *Sov. J. Opt. Technol.*, Vol. 47, No. 3, (March 1980), pp. 159–161.

"A Cold High–Voluum Seal Without Gaskets", by L. Macebo, *University of California Lawrence Radiation Laboratory*, (Sep. 1, 1962), pp. 1–11.

"Diffusionsschweissen Optischer Bauelemente Aus Quarzglas", by K. Veb et al., *Schweisstechnik, Berlin*, (1983), pp. 262–264.

"Pressure and Temperature Measurements with Saw Sensors", by D. Hauden et al., *36th Annual Frequency Control Symposium*, (1982), pp. 284–289.

"Transient Response of Capacitive Pressure Sensors", by P. Pons et al., *Sensors and Actuators*, (1992) pp. 616–621.

"Analysis and Design of a Four–Terminal Silicon Pressure Sensor at the Centre of a Diaphragm", by M. Bao et al, *Sensors and Actuators*, (1987), pp. 49–56.

"A Stress and Temperature Compensated Orientation and Propagation Direction for Surface Acoustic Wave Devices", by B. Sinha, *IEEE Transactions on Ultrasonics, Ferroelectrics, and Frequency Control*, Vol. UFFC–34, No. 1, (Jan. 1987), pp. 64–74.

"Nonlinear Analyses on CMOS Integrated Silicon Pressure Sensors", by K. Suzuki et al., *IEEE*, (1985), pp. 137–140.

"New Techniques for Fusion Bonding and Replication for Large Glass Reflectors", by J. R. Angel, *Steward Observatory, University of Arizona*, pp. 52–56.

"Pressure Sensitivity in Anisotropically Etched Thin–Diaphragm Pressure Sensors", by S. Clark et al, *IEEE Transactions on Electron Devices*, Vol. Ed–26, No. 12, (December 1979), pp. 1887–1896.

"A Model for the Silicon Wafer Bonding Process", by R. Stengl et al., *Japanese Journal on Applied Physics*, (October 1989), pp. 1735–1741.

"Study of the Stressed State of a Sintered Quartz Monoblock", By Y. Lisitsyn et al., *Plenum Publishing Corporation*, (1986), pp. 643–645.

"Direct Bonding in Patent Literature", by J. Haisma, *Philips J. Res.*, (1995), pp. 165–170.

"Special Issue on Direct Bonding", by J. Haisma et al., *Philips Journal of Research*, Vol. 49, No. ½, (1995), pp. 1–182.

"Diversity and Feasibility of Direct Bonding: A Survey of a Dedicated Optical Technology", by J. Haisma et al., *Applied Optics*, Vol. 33, No. 7, (March 1994), pp. 1154–1169.

"Structure and Morphology of the Reaction Fronts During the Formation of $HgAl_2O_6$ Thin Films by Solid State Reaction Between R–cut Sapphire Substrates and HgO Films", by D. Hesse et al., *Interface Science*, (1994) pp. 221–237.

"Development of a High Temperature Capacitive Pressure Transducer", by R.L. Egger, *NASA CR–135282* (October 1977)., pp. 1–114.

"High Temperature Pressure Transducer", *Techlink Industry*, Techlink No. 2359, (1978), 2 pgs.

"Quartz Capsule Pressure Transducer for the Automative Industry", by D.Y. Lee et al., *SAE Technical Paper Series Society of Automative Engineers, Inc.*, (Febuary 1981), 6 pgs.

"Low–Cost High–Sensitivity Integrated Pressure and Temperature Sensor", by P. Pons et al., *Sensors and Actuators*, (1984), pp. 398–401.

"A New Type of High Performance Device for VLSI Digital System", By X. Xiso–Li et al., *Solid State Devices*, (1988), pp. 579–582.

"Wafer Bonding for SOI", by W.P. Maszara et al., *Mat. Res. Soc. Symp. Proc.*, Vol. 107, (1988), 2 pgs.

"Silicon Fusion Bonding for Pressure Sensors", by K. Petersen et al., *IEEE*, (1988), pp. 146–147.

"Silicon–To–Silicon Direct Bonding Method", by M. Shimbo et al., *Journal of Applied Physics*, Vol. 60, No. 8, (October 1986), pp. 2987–2989.

"A Model for the Silicon Wafer Bonding Process", by R. Stengl et al., *Japanese Journal of Applied Physics*, Vol. 28, No. 10, (October 1989), pp. 1735 & 1741.

"A Small and Stable Continuous Gas Laser", by H.G. Van Bueren et al., *Physics Letters* Vol. 2, No. 7, (November 1962), 2 pgs.

"Direct Bonding of Ceramics and Metals by Means of a Surface Activation Method in Ultrahigh Vacuum", by T. Suga et al., *Proceedings of the MRS International Meeting on Advanced Materials*, Vol. 8, (June 1988), pp. 257–263.

"Silicon–On–Insulator Wafer Bonding–Wafer Thinning Technological Evaluations", by J. Haisma et al., *Japanese Journal of Applied Physics*, Vol. 28, No. 8, (August 1989), 4 pgs.

"Closure and Repropogation of Healed Checks in Silicate Glass", by T. Michalske et al., *Journal of the American Cancer Society*, Vol., 68, No. 11, (November 1985), 3 pgs.

"Use of Strain Gauges with a Silicon–On–Sapphire Structure for Thermophysical Experiants", by V.F. Kukarin et al., *Plenum Publishing Corporation*, (1986) pp. 1085–1087.

"Metrological Characteristics for Sapfir–22D Pressure Sensors", by A.M. Evtyushenkov et al., *Plenom Publishing Corporation*, (1989), pp. 147–150.

"Low–Temperature Characteristics of the Transducer", *Rev. Sci. Instrum.*, Vol. 56, No. 6, (June 1985), pp. 1237–1238.

"The Joining of Ceramics", by A.S. Bahrani, *Int. J. for the Joining of Materials*, Vol. 4, No. 1 (1992), pp. 13–19.

"Chemical Free Room Temperature Wafer to Wafer Direct Bonding", by S. Farrens et al., *J. Electrochem. Soc.*, Vol. 142, No. 11, (November 1985), pp. 3949–3955.

"Morphological Evolution of Pore Channels in Alumina", by J. Rodel et al., *Ceramic Transactions—Sintering of Advanced Ceramics*, Vol. 7, (May 1988), pp. 243–257.

"Le Poli Optique, Element De La Construction Des Tubes A Vide(')", by P. Danzin et al., *Annales De Radioelectricite*, (January 1948), pp. 281–289.

"Strength of Glass Ceramic 50115M and its Joints Based on Optical Contact", by A.I. Busel et al, *Plenum Publishing Corporation*, (1983), p 378.

"Bubble–Free Silicon Wafer Bonding is a Non–Cleanroom Environment", by R. Stengl et al., *Department of Mechanical Engineering and Materials Science, Duke University*, (1988) p. L2364.

"Boundary Migration of Single Crystal in Polycrystalline Alumina", by M. Kinoshita, *Journal of the Ceramic Society of Japan*, Vol. 82, No. 945, (1974), pp. 295–296.

"Diffusion Bonding of Ceramics", by C. Scott et al., *American Ceramic Society Bulletin*, (August 1985) pp. 1129–1131.

"Creep of Sensor's Elastic Elements: Metals versus Non–metals", K. Bethe, D. Baumgarten and J. Frank, *NOVA SENSOR—Silicon Sensors and Microstructure*, 1990, pp. 844–849.

"High–Temperature Healing of Lithographically Introduced Cracks in Sapphire", J. Rödel and A.M. Glaeser, *J. Am. Ceram. Soc.*, Vol. 73, No. 3, March 1990, pp. 592–601.

"Fabrication of an Implantable Capacitive Type Pressure Sensor", S. Shoji, T. Nisase, M. Esashi and T. Matsuo, *Transducers '87*, 1987.

"Small sensitive pressure transducer for use at low temperature", W. Griffioen and G. Frossati, *Rev. Sci. Instrum.*, Vol. 56, No. 6, June 1985, pp. 1236–1238.

"Interface charge control of directly bonded silicon structures", S. Bengtsson and O. Engström, *J. Appl. Phys.*, Vol. 66, No. 3, Aug. 1, 1989, pp. 1231–1239.

"Wafer bonding for silicon–on–insulator technologies", J.B. Lasky, *Appl. Phys Lett.*, Vol. 48, No. 1, Jan. 1, 1986, pp. 78–80.

"Production of Controller–Morphology Pore Arrays: Implications and Opportunities", J. Rödel and A.M. Glaeser, *J. Am. Ceram. Soc.*, Vol. 70, No. 8, Augugst 1987, pp. C–172–C–175.

"Low–Temperature Preparation of Silicon/Silicon Interface by the Silicon–to–Silicon Direct Bonding Method", by S. Bengtsson et al., *J. Electrochem. Soc.*, Vol. 137, No. 7, (July 1990), pp. 2297–2303.

"Phase Formation Study in $\alpha-Al_2O_3$ Implanted with Niobium Ions", by L. Romana, P. Thevenard, B. Canut, G. Massouras and R. Brenier, *Nuclear Instruments and Methods in Physics Research B46*, published by Elsevier Science Publishers B.V. (North–Holland), pp. 94–97 (1990).

"Surface electrical properties of Ni–implanted sapphire", by L. Shipu, F. Donghui, X. Ning, S. Zhenya and C. Xiaoming, *Processing of Advanced Materials*, published by Chapman & Hall, pp. 77–80 (1991).

"Silicon Microcavities Fabricated with a New Technique", L. Tenerz and B. Hök, *Electronics Letters*, Vol. 22, No. 11, May 22, 1986, pp. 615–616.

"A Balanced Resonant Pressure Sensor", E. Stemme and G. Stemme, *Sensors and Actuators*, A21–A23, 1990, pp. 336–342.

"Silicon Sensors and Microstructure", J. Brysek, K. Petersen, J. Mallon, Jr., L. Christel, F. Pourahmadi, *NOVA SENSOR*, June 1990, pp. 5.4–5.8, 8.21–8.23, 9.9–9.10, 9.13–9.15.

"Why Nanoparticles Are So BIG", C. Crabb, C. Armesto, T. Kamiya, *Chemical Engineering*, April 1999, pp. 37–41.

"Patterning Plastic with Plentiful Pillars", *SCIENCE*, Vol. 286, p. 1067, 5 Nov. 1999.

*Physical Metallurgy Principles*, pp. 251–269, Oct. 29, 1993.

"Grain Growth Sintering, and Vitrification", *Introduction to Ceramics*, pp. 448–461, Jan. 9, 1990.

U.S. Appl. No. 09/477,689, filed Jan. 6, 2000, Sittler, pending.

U.S. Appl. No. 09/478,383, filed Jan. 6, 2000, Lutz et al., pending.

U.S. Appl. No. 09/478,434. filed Jan. 6, 2000, Frick et al., pending.

U.S. Appl. No. 09/603,640, filed Jan. 6, 2000, Sittler et al., pending.

U.S. Appl. No. 09/755,346, filed Jan. 5, 2001, Romo et al., pending.

* cited by examiner

PRESSURE SENSOR ASSEMBLY

BACKGROUND OF THE INVENTION

The present invention relates to pressure sensors. More specifically, the invention relates to pressure sensors which are used in a corrosive environment.

Pressure sensors are used to measure the pressure process fluids used in industrial processes. The measured pressure is used to monitor and/or control operation of the industrial process.

The process fluid which is sensed by the pressure sensor may, in some instances, be corrosive or otherwise require a highly pure environment. One technique to address such installation requirements is to separate the pressure sensor from the process fluid using an isolation diaphragm. An oil fill couples the pressure sensor to the isolation diaphragm such that pressure applied to the diaphragm is applied to the pressure sensor. However, this isolation technique can introduce errors in pressure measurements.

Various pressure sensor designs are known in the art. One type of pressure sensor is formed of an elongate substantially brittle material. The sensor itself can be fabricated of a corrosion resistance material such as sapphire. Examples of this type of pressure sensor are shown and described in U.S. Pat. No. 5,637,802, issued Jun. 10, 1997; U.S. Pat. No. 6,079,276, issued Jun. 27, 2000; U.S. Pat. No. 6,082,199, issued Jul. 4, 2000; U.S. Pat. No. 6,089,097, issued Jul. 18, 2000; U.S. Ser. No. 09/478,434, filed Jan. 6, 2000; U.S. Ser. No. 09/478,383, filed Jan. 6, 2000; U.S. Ser. No. 09/477,689, filed Jan. 6, 2000; U.S. Ser. No. 09/603,640, filed Jun. 26, 2000; U.S. Ser. No. 09/755,346, filed Jan. 5, 2001; and U.S. Ser. No. 09/978,311, filed Oct. 15, 2001 which are incorporated herein by reference in their entirety.

However, in some embodiment, the bond or seal which is used to couple the elongate pressure sensor to the mounting structure can be corroded by certain types of process fluid or can be a source of contaminates to highly pure process fluids.

SUMMARY OF THE INVENTION

A pressure sensor assembly includes an elongate pressure sensor and a sensor mounting block. The elongate pressure sensor extends through an opening in the mounting block and a seal is provided between the mounting block and the elongate pressure sensor. A protective element covers the seal and at least portions of the elongate pressure sensor to prevent the bond from contacting process fluid.

In one embodiment, the pressure sensor is carried in an elongate sheath which generally conforms to the shape of the pressure sensor. A packing material between the sheath and the pressure sensor is configured to transfer a pressure applied to the sheath to the pressure sensor.

DETAILED DESCRIPTION OF THE PREFERRED EMBODIMENTS

Pressure sensors are used in process monitoring and process control to monitor and/or responsively control the process. Various industrial processes require ultra-high purity for all wetted materials (i.e., materials which are exposed to the process fluid). For example, some processing steps used in the semiconductor industry require ultra-high purity handling procedures for the process fluids. The semiconductor industry follows specifications set forth by SEMI (Semiconductor Equipment and Materials Institute, Inc.) for ultra-high purity material handling. These guidelines set forth acceptable materials and surface conditions for those elements which interface directly with the process media. There are other standards and industries which require ultra-high purity practices.

Many industries which require ultra-high purity practices for handling the process fluid tend to resist the introduction of new materials or surfaces into the process. The use of new materials requires a long certification and testing process. Following certification, the industry must develop a level of confidence that the new material or surface will not add impurities to the process. Thus, it may be impossible, or it may take an extended period of time, to introduce new materials into ultra-high purity processing.

In general, pressure transmitters which are currently used to measure pressures in ultra-high purity processes have errors in their pressure measurements. One source of errors is the requirement that the pressure sensor comply with ultra-high purity practices. This may require the introduction of an isolation diaphragm which physically isolates the pressure sensor from the process fluid. Another source of errors is simply due to the configuration and characteristics of the pressure sensor. The present invention provides a technique for using highly accurate elongate pressure sensors in ultra-high purity processes.

Figure 1A:
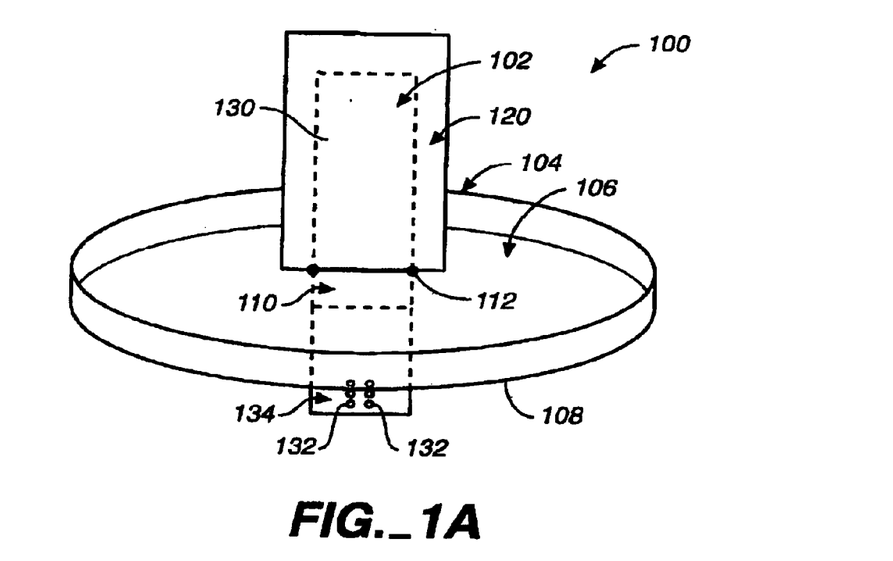
FIG. 1A is a side perspective view of a pressure sensor assembly in accordance with the present invention.
Figure 1B:
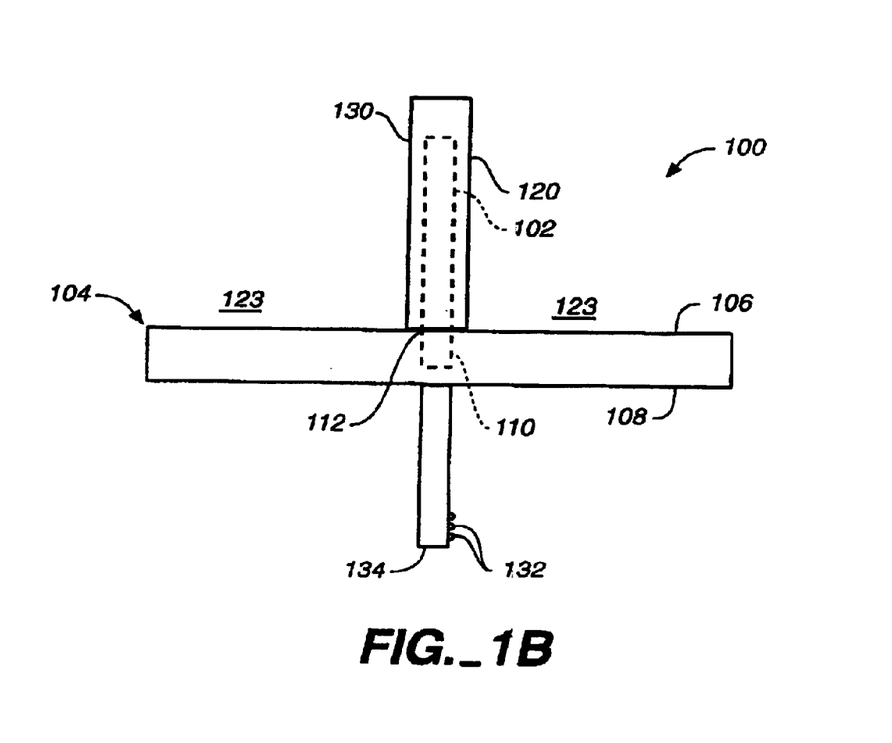
FIG. 1B is a side plan view of the pressure sensor assembly of FIG. 1A.
Figure 1C:
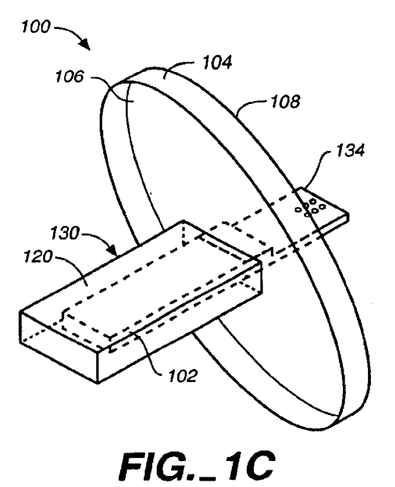
FIG. 1C is a front perspective view of the pressure sensor assembly of FIG. 1A.

FIG. 1A is a side perspective view, FIG. 1B is a side plan view and FIG. 1C is a front perspective view of an elongate pressure sensor assembly 100 in accordance with one embodiment of the present invention. Pressure sensor assembly 100 includes elongate pressure sensor 102. Pressure sensor 102 is a highly accurate pressures sensor and may comprise a brittle material such as sapphire. Pressure sensor 102 is discussed in U.S. Pat. No. 5,637,802, issued Jun. 10, 1997; U.S. Pat. No. 6,079,276, issued Jun. 27, 2000; U.S. Pat. No. 6,082,199, issued Jul. 4, 2000; U.S. Pat. No. 6,089,097, issued Jul. 18, 2000; and U.S. Ser. No. 09/978, 311, filed Oct. 15, 2001 which are incorporated herein by reference in their entirety.

The sensor mounting block 104 has a first side 106 and an opposed second side 108 with an opening 110 extending therebetween. Elongate pressure sensor 102 extends through opening 110 between sides 106 and 108. A seal (or bond) 112 seals the interface between sensor 102 and mounting block 104. Seal 112 can comprise, for example, a weld or braze (gold germanium, solders, adhesives, etc.).

This type of sensor configuration provides accurate measurements, in some instances accuracy which is orders of magnitude higher than prior art techniques. The sensor 102 consists of two wafers of substantially brittle material fused together to create a capacitance based absolute pressure sensing device capable of operating at pressures up to 3000 psi. A thin layer of metal, such as chromium, can be deposited along the entire length of the sensor 102, for example by sputtering. The chromium provides a shield to stray capacitance and electrical noise. A layer of nickel can be deposited over the chromium and used for bonding to the sensor when the sensor is mounted in a mounting block.

One difficulty in using this sensor configuration is mounting the sensor 102 to some type of support structure such as mounting block 104 such that it can be coupled to the process. All materials which are exposed to the process should be acceptable for ultra-high purity applications. Example materials include vacuum melted austenitic stainless steel, chromium and nickel, all with an electropolished surface finish. Additionally, perfluoroelastomers/fluoropolymers in high purity form can also be used.

In accordance with one embodiment of the invention, a protective element (i.e., a sheath or coating) 120 covers the elongate pressure sensor 102 and seal 112. Protective element 120 isolates pressure sensor 102 and seal 112 from the process fluid 123. Element 120 can be applied using any appropriate technique. Various examples are set forth below.

In operation, a distal end 130 of pressure sensor 102 is responsive to applied pressure. Electrical contacts 132 carried on a proximal end 134 of sensor 102 provide an output which is representative of the applied pressure. For example, capacitive plates can be carried within distal end 130. The capacitance can be measured through contacts 132 and is related to the deflection of the capacitive plates and therefore the applied pressure.

Protective element 120 is in contact with a pressurized fluid and deflects in a manner such that the pressure applied by the pressurized fluid is transferred to the pressure sensor 102. Protective element 120 can be fabricated using any appropriate technique and is preferably of a configuration such that the applied pressure is accurately and repeatably transferred to the pressure sensor 102 while conforming to the practices required in ultra-high purity processes. A number of example configurations and fabrication techniques are set forth below. However, in broad aspects, the invention is not limited to these specific embodiments.

In one embodiment, protective element 120 constitutes a coating and is fabricated by molding a larger piece of moldable material, such as plastic over the sensor 102 and at least part of the mounting block 104. One alternative is to use a molding process that uses high pressure molding techniques in order to achieve a very thin coating. Alternatively, the molding piece is formed as a thick body and then the molded piece is exposed to a material removal process, such as by a machining process. The protective coating 120 is sufficiently thin to allow the applied pressure to be transferred to the sensor 102. Any appropriate moldable plastic can be used including polytetrafluoroethylene (PTFE). The high Young's Modulus of the sensor 102 minimizes any effects due to the protective coating of plastic.

Figure 1D:
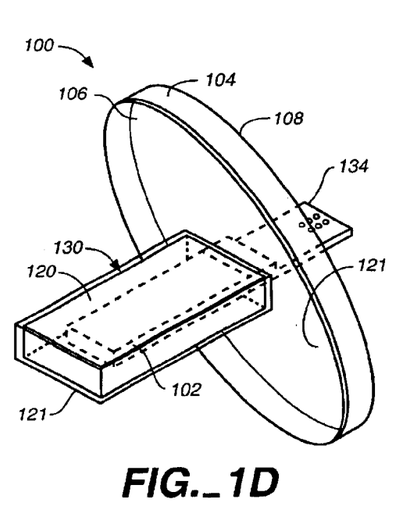
FIG. 1D is a front perspective of the pressure sensor assembly of FIG. 1A with electroplating.

In another embodiment, illustrated in the perspective view of FIG. 1C, protective element 120 comprises a metallic layer which is overmolded onto the sensor 102. The material should be molded at a temperature which is lower than a temperature which could damage sensor 102. For example, a magnesium alloy can be used. The overmold layer 120 must be relatively thin over the sensing portion of the sensor 102 so that the sensor can respond to small pressure gradient regardless of the material used for the metal overmold. All wetted surfaces may preferably be electroplated with stainless steel or chromium layer 121 (shown in FIG. 1D) and then electropolished.

Figure 2A:
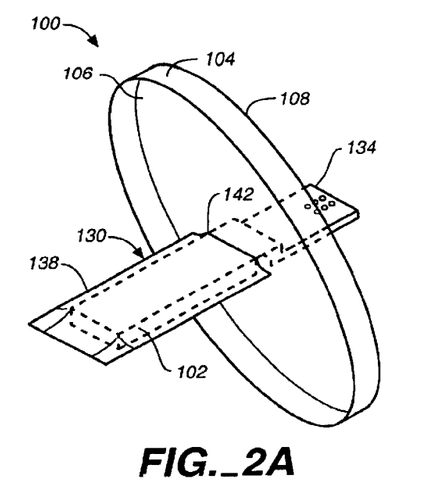
FIGS. 2A and 2B are perspective views of pressure sensor assembly in accordance with other embodiments.

FIG. 2A is a perspective view of another example embodiment of sensor assembly 100 in which protective element 138 comprises a flexible sheath/coating which receives pressure sensor 102. Coating/sheath 138 comprises a thin layer of flexible material and forms a "bag" which receives sensor 102. A vacuum is applied to the open end 142 of the sheath/coating 138 such that its profile contacts and tightly conforms to the sensor 102. The coating/sheath 138 can comprise PTFE (Polytetrafluoroethylene), PFA (Perfluoroalkoxy), PVC (Polyvinyl chloride), PEEK (Polyetheretherketone) or PET (Polyethylene Terephthalate), for example. The coating/sheath 138 can be sealed by any appropriate technique including thermal, thermal sonic or adhesive techniques.

Figure 2B:
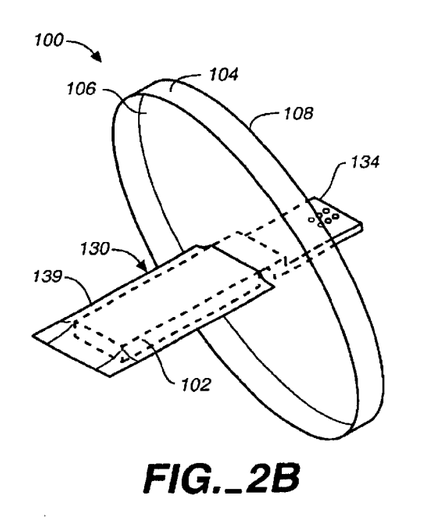

In another embodiment illustrated in FIG. 2B, the protective element 139 comprises a flexible metal, such as a thin layer of metal foil, which is seam welded around sensor 102. The metal foil should be of a material which is accepted in ultra-high purity processes and be sufficient to transfer the applied pressure to the pressure sensor. Preferably, an intermediate material such as the packing material described above in the previous embodiment is used as a coupling between the protective metal foil 139 and the sensor 102. Preferably, the seam welding procedure would need to be hermetic and the wetted surfaces would need to be electropolished. Example materials for the metal foil include 300 Series Stainless Steel, Nickel Chromium alloy, Hastalloy, Elgiloy. Welds can preferably be formed by laser electron beam or as a resistance weld. In the embodiment of FIG. 2B, the protective element 139 is connected to the mounting block 104 by, for example, a bond such as a weld.

Figure 3A:
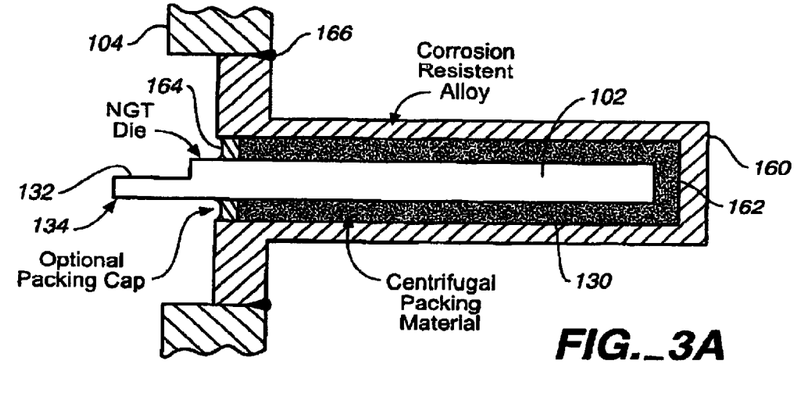
FIG. 3A is a side cross-sectional view of a pressure sensor having a protective element in accordance with the invention formed by a sheath.

FIG. 3A is a side cross-sectional view of another embodiment of the present invention in which a protective element 160 is formed by a thin tube into which the sensor 102 is placed. Protective element 160 is formed by a sheath fabricated of a material, which is acceptable to ultra-high pure process specifications. For example, a metal tube can be used. Examples include 300 Series stainless. The protective element 160 generally conforms to the shape of sensor 102.

An optional packing material 162 can be used to fill any space between protective coating 160 and sensor 102. Packing material 162 can comprise, for example, a pure alumina powder. During fabrication, the powder can be used in a slurry form and a centrifuge used to force the slurry into the opening of the protective element 160. A cap 164 is used to hold the packing material 162 within the protective coating 160 and secure the sensor 102 therein. The cap 164 can be, for example, a layer of epoxy or low temperature glass and will act as a barrier to humidity if desired.

In another example, a small amount of binder can be used in the packing material 162 to cause the packing material to solidify when sintered. For example, a glass powder that sinters or flows at sufficiently low temperatures can be used to fix the packing material 162.

Another example packing material 162 includes a metal powder used either in a packed state or sintered. The metal powder can be braised or soldered to permanently seal the protective coating 160. In all embodiments, the packing material provides a coupling between the protective element 160 and the sensor 102 without inparting mounting stress onto the sensor 102. By sintering or reflowing the packing material, performance degradation due to shifts of the packing material can be reduced.

In the embodiment of FIG. 3, the protective element 160 is coupled to the mounting block 104 by, for example, a bond 166. The bond can comprise a weld. The welding procedure should be hermetic and be of a material suitable for ultra-pure installations. The wetted surfaces are then electropolished.

Figure 3B:
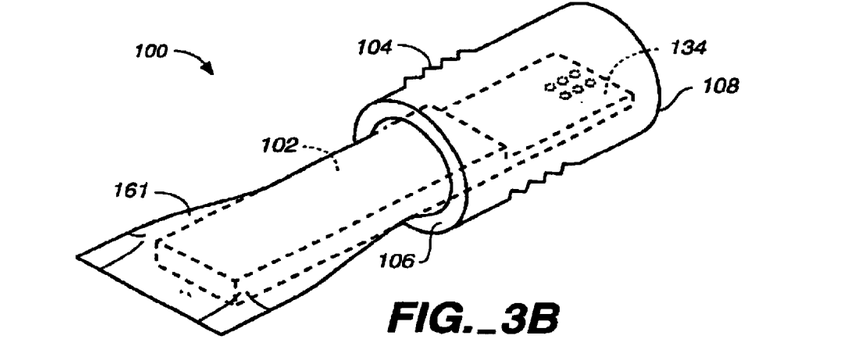
FIGS. 3B and 3C are perspective and plan views of an embodiment of the present invention.
Figure 3C:
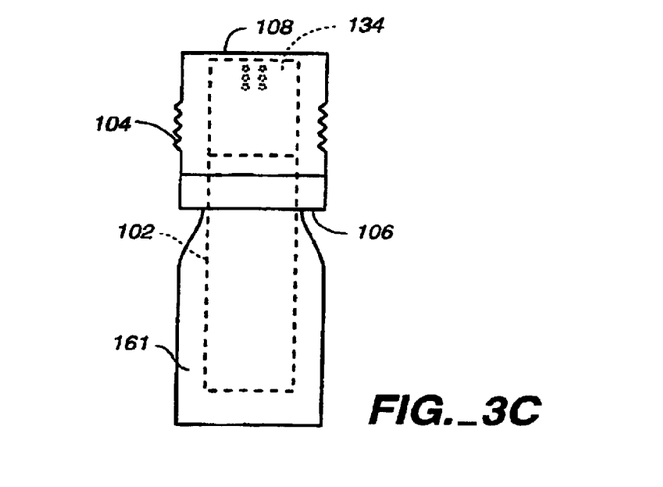

FIG. 3B is a perspective view and FIG. 3C is a plan view of one alternative of the embodiment of FIG. 3A in which the protective element takes the form of a metal tube which is welded closed at one end and then swaged at its midsection to conform to the sensor 102. As illustrated in FIGS. 3B and 3C, the swaged portion extends along the distal length of sensor 102 which causes the protective element 161 to flatten and conform to the shape of the sensor 102. However, the proximal end of the metal tube is not swaged and has a generally circular cross-section which is welded to the mounting block 104. As describe above, a packing material is preferably inserted or disposed between the swaged tube and the sensor as a medium to transfer pressure from the wetted swaged tube to the sensor.

Figure 4:
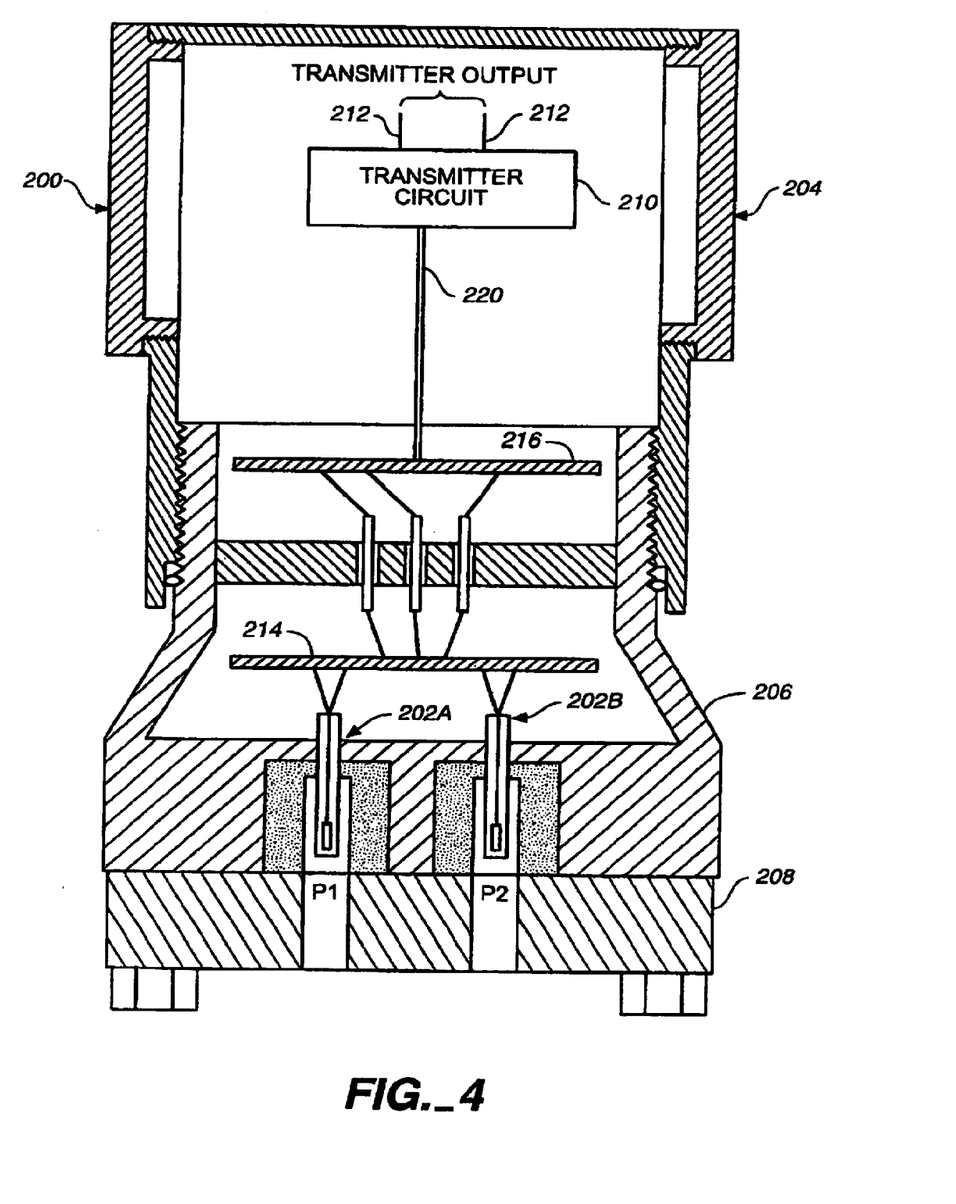
FIG. 4 is a side cross-sectional view of a transmitter including a pressure sensor assembly of FIGS. 1A–C, FIGS. 2A, 2B or FIGS. 3A–C.

FIG. 4 shows a differential pressure transmitter 200 which includes pressure sensor assemblies 202A, 202B having protective coatings in accordance with the invention. Transmitter 200 includes having transmitter body 204, sensor body 206 and flange 208. Sensor body 206 includes pressure sensors assemblies 202A and 202B which measure absolute pressure P1 and absolute pressure P2, respectively, of process fluid. Transmitter body 204 includes transmitter (I/O) circuitry 210 which sends information related to pressures P1 and P2 over a two-wire process control loop, such as a 4–20 mA current loop 212. Circuit board 214 couples sensor circuit board 216 to sensors 202A and 202B and receives electrical signals related to pressures P1 and P2. Circuitry on sensor circuit board 216 digitizes and processes these signals, and communicates pressure information to transmitter circuitry 210 using data bus 220.

The present invention provides a pressure sensor assembly which utilizes a highly accurate pressure sensor in a configuration which is acceptable to ultra-high purity processes. A protective element is used to cover surfaces which are not compatible with ultra-high purity process procedures such as to cover a bond which bonds a pressure sensor of a brittle material to a mounting block. The protective element is configured to allow pressure to be transferred to the pressure sensor while preventing the bond from contacting the process fluid. The protective element can be of an appropriate material and processed in such a manner that it is acceptable to industries which utilize ultra-high purity processes.

Although the present invention has been described with reference to preferred embodiments, workers skilled in the art will recognize that changes may be made in form and detail without departing from the spirit and scope of the invention. For example, in various aspects, other types of coating material or techniques can be used. Further, various techniques used to fabricate the protective element can be varied as can be the shape of the protective element. In some aspects, although the figures and discussion herein relate to an elongate pressure sensor, other pressure sensor configurations are included within the scope of the invention. Similarly, in various aspects the present invention is not limited to a pressure sensor of a brittle material. Other packing materials include ceramic powder (conductive or non-conductive) which reduce hysteresis and creep errors or dielectric powders such as glasses and $SiO_2$.

What is claimed is:

1. A pressure sensor assembly configured to measure pressure of a process fluid, comprising:
   an elongate pressure sensor having a proximal connection end and a distal pressure sensing end;
   a sensor mounting block having a first side, an opposed second side and an opening extending therebetween, the elongate pressure sensor extending through the opening;
   a seal between the mounting block and the elongate pressure sensor; and
   a protective element formed to the elongate pressure sensor and the seal which covers the seal and at least portions of the elongate pressure sensor to prevent corrosion of the bond due to contact with the process fluid, the protective element configured to transfer an applied pressure to the pressure sensor.

2. The apparatus of claim 1 wherein the protective element comprises polytetrafluoroethylene (PTFE).

3. The apparatus of claim 1 wherein the protective element comprises a metal foil.

4. The apparatus of claim 1 wherein the protective element comprises an overmolded metal layer.

5. The apparatus of claim 1 wherein the protective element comprises a material selected from the group of materials consisting of metal, PTFE, polyethalynes, polypropelynes, Nickel Chromium alloy and Hastalloy.

6. The apparatus of claim 1 wherein the protective element includes an electroplated metal layer over the protective element.

7. The apparatus of claim 1 wherein the protective element comprises a molded material.

8. The apparatus of claim 7 wherein the molded material is machined to conform to the elongate pressure sensor.

9. The apparatus of claim 1 wherein the protective element comprises a sheath configured to receive the elongate pressure sensor.

10. The apparatus of claim 9 including packing material between the sheath and the elongate pressure sensor.

11. The apparatus of claim 9 including a weld which bonds the sheath to the sensor mounting block.

12. The apparatus of claim 9 wherein the sheath is sealed with a vacuum.

13. A pressure sensor assembly configured to measure pressure of a process fluid, comprising:
   a corrosion resistant mounting block;
   an elongate pressure sensor, the pressure sensor having a proximal connection end and a distal pressure sensing end;
   an elongate sheath formed to the elongate pressure sensor of a corrosion resistant material open at a proximal end and closed at a distal end carrying the elongate pressure sensor therein, the sheath generally conforming to a shape of the pressure sensor to prevent contact of the elongate pressure sensor element with the process fluid and configured to transfer applied pressure to the pressure sensor;
   a packing material between the sheath and the pressure sensor configured to transfer a pressure applied to the sheath to the pressure sensor; and
   a bond coupling the elongate sheath to the mounting block, the bond of a corrosion resistant material.

14. The apparatus of claim 13 wherein the bond comprises a weld.

15. The apparatus of claim 13 wherein the packing material seals the sheath.

16. The apparatus of claim 13 including a cap configured to seal the packing material in the sheath.

17. The apparatus of claim 13 wherein the packing material includes a binder.

18. The apparatus of claim 13 wherein the elongate sheath is selected from a material selected from the group of materials consisting of metal, PTFE, polyethalynes, polypropelynes, Nickel Chromium alloy and Hastalloy.

19. The apparatus of claim 13 wherein the packing material includes a metal powder.

20. The apparatus of claim 19 wherein the metal powder is in a packed state.

21. The apparatus of claim 19 wherein the metal powder is sintered.

22. The apparatus of claim 13 wherein the packing material includes a ceramic powder.

23. The apparatus of claim 22 wherein the ceramic powder is in a packed state.

24. The apparatus of claim 22 wherein the ceramic powder is sintered.

25. The apparatus of claim 13 wherein the packing material includes a dielectric powder.

26. The apparatus of claim 25 wherein the dielectric powder is in a packed state.

27. The apparatus of claim 25 wherein the dielectric powder is sintered.

* * * * *